United States Patent
Dunlap et al.

[15] 3,669,467
[45] June 13, 1972

[54] VEHICLE ELASTOMERIC SUSPENSION SYSTEM

[72] Inventors: Dennis L. Dunlap, Kansas City, Mo.; Darrel L. Bryan, Overland Park, Kans.

[73] Assignee: Pacific Car and Foundry Company, Bellevue, Wash.

[22] Filed: Feb. 26, 1970

[21] Appl. No.: 50,042

[52] U.S. Cl. ............................................. 280/124, 267/21
[51] Int. Cl. ........................................................ B60g 11/22
[58] Field of Search .................. 267/15, 21, 63, 10; 280/124

[56] References Cited

UNITED STATES PATENTS

| | | | |
|---|---|---|---|
| 3,495,848 | 2/1970 | Hickman | 267/21 |
| 2,730,356 | 1/1956 | Hunter | 267/63 |
| 1,846,045 | 2/1932 | Albertson | 267/10 |
| 2,553,188 | 5/1951 | Grube | 267/21 |
| 3,084,952 | 4/1963 | Freitas | 267/11 |

*Primary Examiner*—Philip Goodman
*Attorney*—Seed, Berry & Dowrey

[57] ABSTRACT

An elastomeric rear axle suspension system for a vehicle consisting of spherical springs of an elastomeric material and elastomeric support pads, the spherical springs and support pads being in position between a support mounted to the axle and the vehicle frame. The spherical springs and support pads contact the frame when the vehicle is loaded, and the spherical springs lift the frame away from the support pads. Rebound cables control excessive motion which would separate the axle from the frame.

9 Claims, 4 Drawing Figures

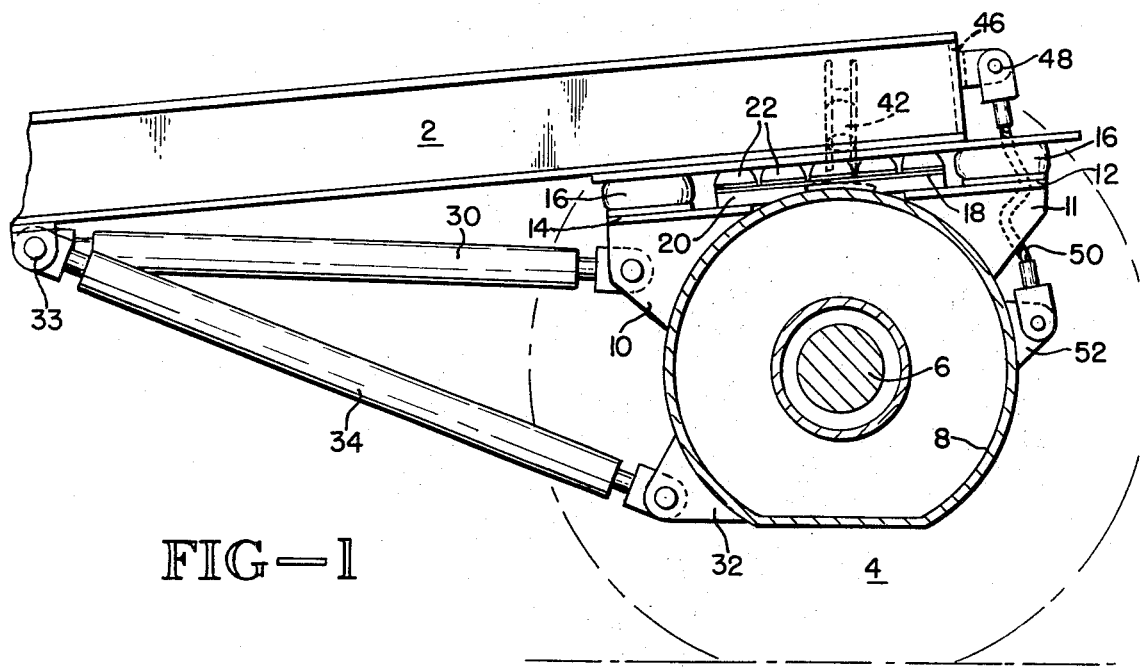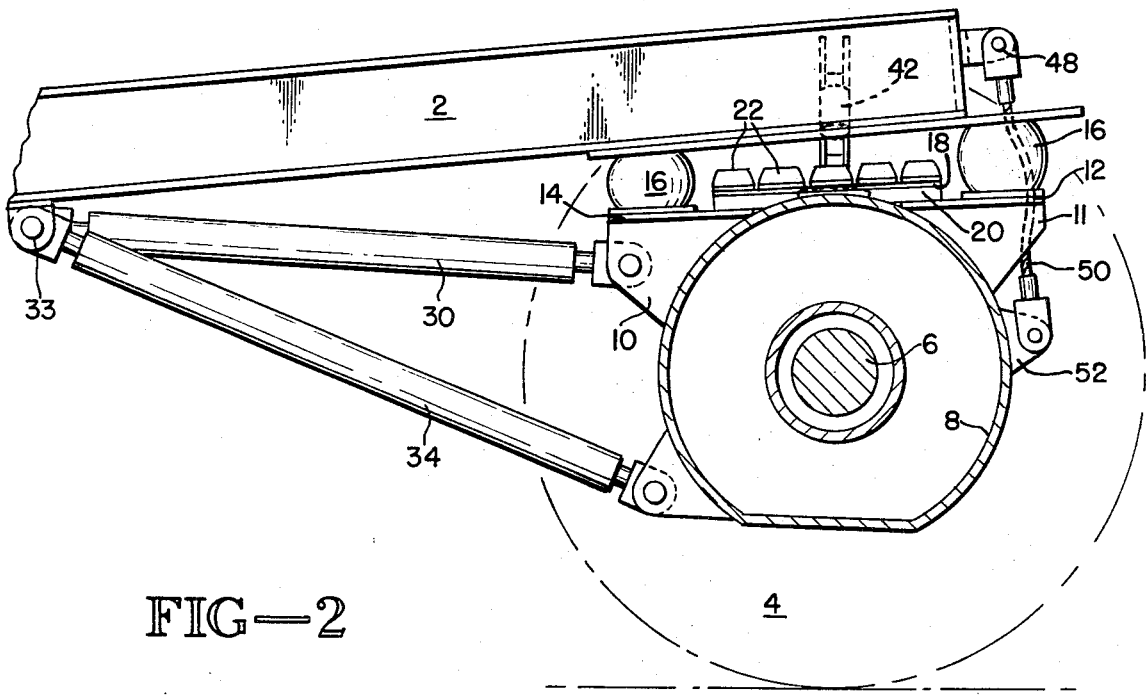

INVENTORS
DENNIS L. DUNLAP
DARREL L. BRYAN 3,669,467

VEHICLE ELASTOMERIC SUSPENSION SYSTEM

BACKGROUND OF THE INVENTION

The present invention relates to vehicle suspension systems generally and more particularly to an improved elastomeric suspension system.

Present rear axle suspension systems for load-bearing trucks generally employ metallic springs, air cylinders or stacked rubber suspension units of sufficient strength to support the truck frame under heavy loading conditions. Suspension springs normally allow the frame to bounce off the spring suspension when the truck is in an unloaded condition; springs strong enough to provide suspension under heavy load conditions are incapable of providing gentle spring action when the truck is operated under low load conditions. Additionally, metal fatigue, maintenance problems and space limitations are experienced when metal spring suspension systems are employed.

Air cylinder and stacked rubber suspension systems are complex, often unstable and are subject to malfunction. These systems are necessarily placed inboard of the frame rails of the vehicle, thereby providing a resultant lack of roll stability. Additionally, these combination suspension systems have required a large allocation of space and are not generally operative to provide a stable support under no-load conditions.

Leaf spring suspension systems combined with rubber bumper pads have been used to reduce shock, but such bumper pads operate only as shock bumpers and form no part of the actual load support system.

It is an object of the present invention to provide a novel and improved elastomeric vehicle suspension system which operates effectively to provide a stable support under rated load conditions and which reduces bounce and produces a gentle spring action under no-load conditions.

Another object of the present invention is to provide a novel and improved elastomeric vehicle suspension system which operates effectively as a multi-stage variable rate spring to permit free vertical motion of the vehicle axle under no-load conditions and progressively lesser axle motion under increased load conditions.

A further object of this invention is to provide a novel and improved elastomeric vehicle suspension system which is used with maximum road stability by providing support directly under the vehicle frame rails.

A still further object of this invention is to provide a novel and improved elastomeric suspension system which incorporates elastomeric components which are long lasting and free from maintenance requirements.

Yet another object of the present invention is to provide a novel and improved elastomeric vehicle suspension system wherein the means for attaching the load supporting and driving axle to the vehicle frame includes means for incorporating a pivotal movement of the axle as it moves in a generally vertical direction.

BRIEF DESCRIPTION OF THE DRAWINGS

FIG. 1 is a side elevational view of the suspension system on one side of the vehicle under loaded conditions;

FIG. 2 is a side elevation of the same side as FIG. 1 in a no-load condition;

DETAILED DESCRIPTION OF THE DRAWINGS

Figure 3:
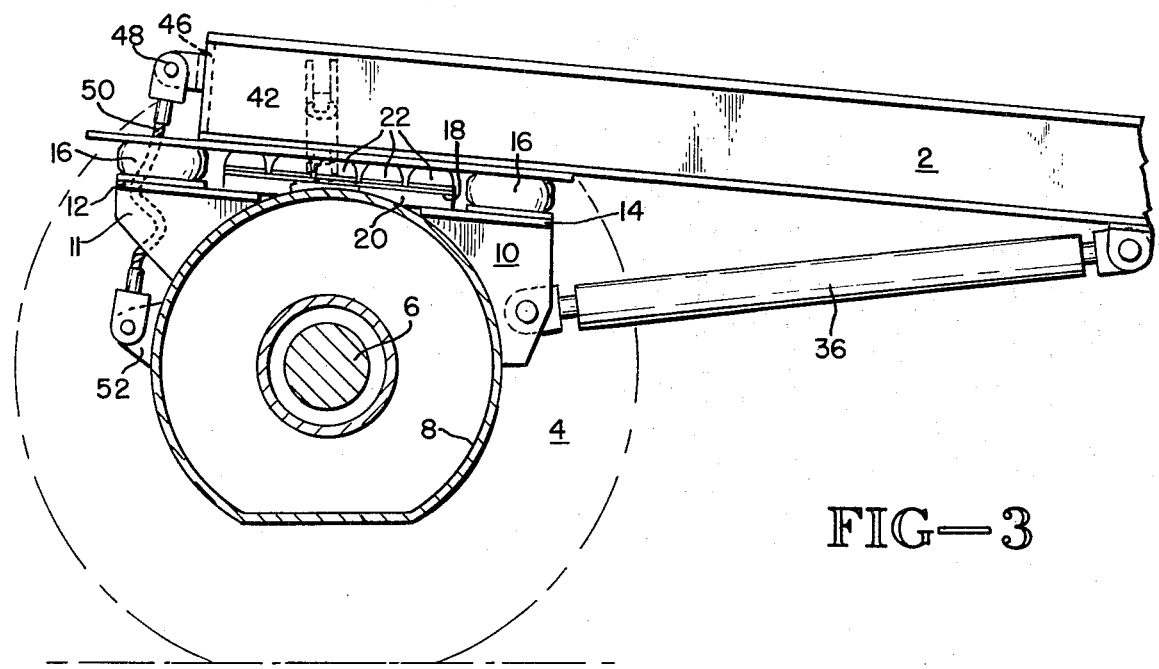
FIG. 3 is a side elevational view of the other side of the vehicle in a load condition.

In brief, the present invention relates to an elastomeric vehicle suspension system consisting of a combination of spherical elastomeric springs, such as are readily available on the market, support pads, rebound cables and a roll stabilizing means. The vehicle frame is supported by both a plurality of support pads and spherical springs under load conditions, while under no-load conditions, the spherical springs lift the frame of the vehicle away from the support pads. Additional travel in rebound direction is controlled by cables.

Support is provided directly beneath a vehicle frame and lateral forces are restrained by a stabilizer positioned above the rear axle of the vehicle. Fore and aft driving and braking forces are transmitted by heavy-duty radius rods spaced widely apart for maximum rigidity of axle positioning.

Referring now to FIGS. 1 and 2, which depict the lefthand side of the vehicle in the preferred embodiment, it can be seen that there are incorporated into the system, standard portions of a vehicle including a framework 2, the wheel 4, and its associated axle 6 having an exterior housing 8. Rigidly mounted on the upper portion of the axle housing 8 are a pair of platforms 10 and 11 which are respectively secured to opposite sides of the upper portion of the axle housing and present upwardly smooth planar surfaces 12 and 14. The surfaces 12 and 14 support the elastomeric springs 16. Mounted so that it bridges the top of the axle housing 8, rests upon and is secured to surfaces 12 and 14 of supports 10 and 11, is support member 20, having an upwardly facing planar surface 18. Mounted upon the surface 18 are a plurality of rubber support pads 22. The opposite side of the vehicle, depicted in FIG. 3, is identical insofar as the structure hereinabove described and so will not be repeated.

Pivotally mounted to the lower portion of platform 10 of the left side (FIGS. 1 and 3) is a rod 30 which extends forwardly of the axle to a point 33 upon the frame 2 where it is pivotally mounted. At the lower forward end of axle housing 8 is an ear 32 to which is secured a pivotally-mounted rod 34 which extends forwardly of the axle and again is pivotally secured to the frame 2 at point 33.

The right-hand side of the vehicle, as depicted in FIG. 3, is identical (as noted above) with the exception of the fact that rather than having two rods (30, 34), as is true on the left-hand side, there is a need for only a single rod 36 which extends forwardly of the axle pivotally secured to the platform 10 and to the framework 2. The point of securement for the rods on both sides of the vehicle is at the same linear position on the frame.

Referring now specifically to FIGS. 1 and 3, both of which show the truck in a fully loaded condition, it can be seen that the rod 36 which appears on the right-hand side of the vehicle, is the pivotal equivalent or geometric resultant of the two rods 30, 34 on the left-hand side.

The two rods 30, 34 maintain the axle in an upright position and prevent any rotation of the axle and associated suspension elements from rotating about the axis of the axle during acceleration or braking of the vehicle. The rods 30, 34 likewise serve to retain the axle in the proper fore and aft position with respect to the framework at times of acceleration or braking when the forces of inertia tend to move the frame relative to the axle.

An additional and very important function of the pair of rods 30, 34 on the left-hand side of the axle is that the pivotal attachment to the frame causes the entire axle to rotate about the point 53 when the frame is moved vertically relative to the axle. The pivotal movement of the axle and support members about point 33 compresses the elements 16, 22 of the suspension system only to the extent necessary to compensate for the load to which it is subjected. In a no-load condition, the major portion of the weight will be carried by the forwardmost elements 16. As the load increases, all of the elastomeric elements 16 will be compressed until, at a fully-loaded condition, the load will be carried by all of the elements 16, 22.

Figure 4:
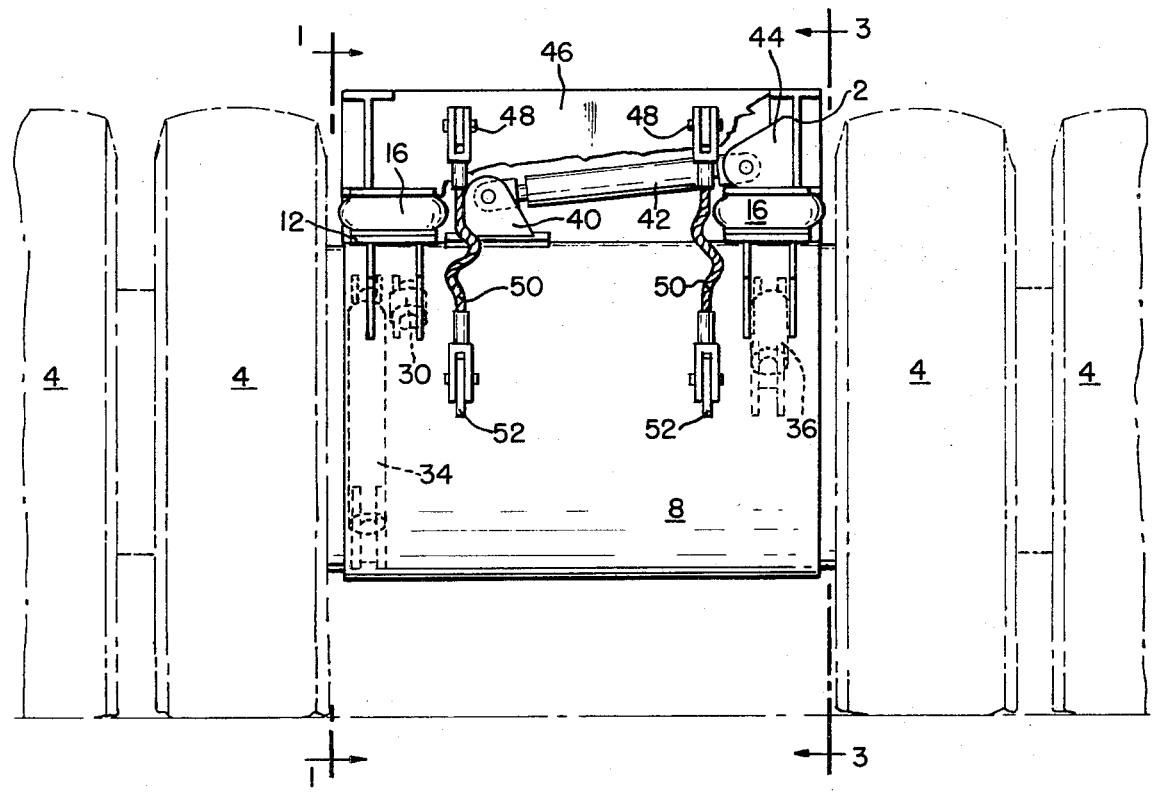
FIG. 4 is a rear elevational view of the elastomeric system in a load condition.

Referring now specifically to FIG. 4, it can be seen that the wheels 4 lie outboard of the axle housing 8 and that the multi-stage suspension system which comprises the elastomeric elements 16, 22 (the elements 22 being hidden behind 16 from this view) lie immediately inboard of the wheels and support the framework 2 at the point axially outermost along the axle, thus providing substantial roll control. Mounted to the upper portion of the axle housing 8 is a clevis 40 which has pivotally connected thereto a stabilizer rod 42 which is, in turn, mounted to the clevis 44 upon the framework 2. A stabilizer rod above the axle positions the axle laterally with respect to the frame. In the preferred embodiment, there are cross struts 46 which span the space between the two frame rails 2 at a position above the axle housing 8.

Mounted to the rearmost cross strut 46 are a pair of ears 48 which have connected thereto a pair of rebound cables 50 which are mounted at their lower end to a pair of ears 52 secured to the axle housing 8. Rebound cables 50 prevent separation of the frame and the axle.

It will thus be noted that, in operation, when the vehicle is empty, the inventive suspension system will provide a relative soft ride in that the only suspension element under appreciable compression will be the forwardmost pair of elastomeric springs 15, the geometry being such that the rearwardmost pair of the elastomeric springs 16 will force the framework 2 of the vehicle upwardly away from the platform 10. As the load upon the vehicle increases, the axle will effectively pivot about points 33 causing the forwardmost elastomeric spring pair 16 to compress continuously until the fully-rated load condition, as depicted in FIGS. 1, 3 and 4, is reached. The entire set of elastomeric springs 16 will be compressed to the same stress and the frame, too, will actually rest upon the secondary bumpers 22 under rated load conditions. As explained above, the radius rods and trailing arms 30, 34 and 36, provide the unique pivotal action of the axle about the framework, giving the vehicle a continuously variable spring effect.

The embodiments of the invention in which an exclusive property or privilege is claimed are defined as follows:

1. A suspension system for a vehicle having a frame and a pair of spatially located wheels joined by an axle comprising:
   an elongated suspension supporting means rigidly mounted to the axle generally parallel to the frame,
   elastomeric suspension means mounted between the support means and the frame providing support along substantially he entire support means, and
   means pivotally connecting the axle to the frame whereby relative vertical movement of the frame and the axle causes an angular movement of the axle about a point on the frame and thus causes the suspension supporting means to have a varying angle to the frame depending upon the load and providing greater support the more nearly parallel the supporting means is to the frame.

2. A suspension system as in claim 1, wherein the suspension means comprises a plurality of the elastomeric spheres which are mounted between flat surfaces thereby resulting in a varying rate of rebound for varying loads.

3. A suspension system as in claim 1, wherein the suspension system further includes a second supporting means having mounted thereon rubber support pads of lesser vertical dimension than the first suspension means whereby the vehicle, when loaded, will be supported by both systems the first system having been compressed to the point of contact between the frame and the second supporting means.

4. A suspension system as in claim 1, further including a rod means for positioning the axle laterally with respect to the frame.

5. A suspension system for a vehicle having a pair of spatially located wheels joined by an axle and a framework located above the axle comprising:
   a platform mounted upon the upper portion of the axle beneath the frame, elastomeric suspension means including elements of differing compression ratios mounted on top of the platform for abutment against the frame, and means rigidly attached to the axle and pivotally attached to the frame, causing the axle to pivot about the frame connection point as the frame moves vertically relative to the axle whereby the platform is at an acute angle to the frame except when the vehicle is fully loaded and the frame rests upon only those elastomeric elements necessary to support the load.

6. A suspension system as in claim 5 wherein the pivotal connecting means comprises a pair of arms pivotally attached to the frame at the same point, and attached to the axle housing at vertically spaced points.

7. A suspension as in claim 5, wherein the pivotal connecting means comprises a pair of rods attached to the frame spatially attached along the vertical line of one end of the axle and a single rod attached to the other said frame to the other end of the axle.

8. A suspension system as in claim 5 and further including a stabilizer rod mounted to the upper portion of the axle housing and extending generally longitudinally of the axle and attached to the frame.

9. A suspension system as in claim 5 and further including rebound means to control the vertical upward movement of the frame with respect to the axle.

* * * * *